(12) United States Patent
Shimizu et al.

(10) Patent No.: US 7,136,732 B2
(45) Date of Patent: Nov. 14, 2006

(54) ELECTRIC POWER STEERING APPARATUS

(75) Inventors: Yoshinobu Shimizu, Sakai (JP); Shinya Aono, Okazaki (JP); Akihiro Nishiyama, Okazaki (JP)

(73) Assignees: Favess Co., Ltd., Aichi (JP); Koyo Seiko Co., Ltd., Osaka (JP); Toyoda Koki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/927,528

(22) Filed: Aug. 27, 2004

(65) Prior Publication Data
US 2005/0061577 A1 Mar. 24, 2005

(30) Foreign Application Priority Data
Sep. 8, 2003 (JP) ............................. 2003-315732

(51) Int. Cl.
B62D 6/04 (2006.01)
B62D 6/00 (2006.01)

(52) U.S. Cl. ..................... 701/41; 180/446; 180/448; 180/441; 180/434; 180/439; 180/417; 701/42

(58) Field of Classification Search ............... 180/446, 180/417, 428, 441, 434, 439; 701/41, 42
See application file for complete search history.

(56) References Cited

U.S. PATENT DOCUMENTS

| | | | | |
|---|---|---|---|---|
| 5,732,373 A | * | 3/1998 | Endo | 701/42 |
| 6,816,765 B1 | * | 11/2004 | Yamamoto et al. | 701/41 |
| 6,856,869 B1 | * | 2/2005 | Takahashi | 701/41 |
| 6,863,150 B1 | * | 3/2005 | Tanaka et al. | 180/446 |
| 6,876,910 B1 | * | 4/2005 | Kifuku | 701/41 |
| 6,883,636 B1 | * | 4/2005 | Kanda | 180/446 |
| 6,896,094 B1 | * | 5/2005 | Chabaan | 180/446 |
| 6,898,497 B1 | * | 5/2005 | Teramoto | 701/41 |
| 6,907,334 B1 | * | 6/2005 | Yoshida et al. | 701/41 |
| 2001/0017229 A1 | | 8/2001 | Kada et al. | |

FOREIGN PATENT DOCUMENTS

| | | |
|---|---|---|
| EP | 1 134 147 A2 | 9/2001 |
| EP | 1 138 577 A2 | 10/2001 |
| EP | 1138577 A2 * | 10/2001 |
| EP | 1 452 421 A2 | 9/2004 |
| JP | 9-58501 | 3/1997 |

* cited by examiner

*Primary Examiner*—Lesley D. Morris
*Assistant Examiner*—Marlon Arce-Diaz
(74) *Attorney, Agent, or Firm*—Rabin & Berdo, PC

(57) ABSTRACT

An electric power steering apparatus transmits a driving force of an electric motor to a steering mechanism for steering assist. The apparatus includes a torque sensor which detects a steering wheel torque; a basic assist characteristic determining section which determines a basic assist characteristic defining a basic characteristic of a motor driving target value for the steering torque; a motor driving target value determining section which determines the motor driving target value for the steering torque in accordance with a modified assist characteristic prepared by shifting the basic assist characteristic along a steering torque coordinate axis; a shift amount determining section which determines the amount of the shift from the basic assist characteristic to the modified assist characteristic on the basis of the steering torque; and a motor driving section which drives the electric motor on the basis of the motor driving target value.

5 Claims, 8 Drawing Sheets

ELECTRIC POWER STEERING APPARATUS

BACKGROUND OF THE INVENTION

1. Field of the Invention

The present invention relates to an electric power steering apparatus which is adapted to transmit a driving force generated as a steering assist force by an electric motor to a steering mechanism.

2. Description of Related Art

Electric power steering apparatuses are conventionally used, which are adapted to transmit a driving force generated by an electric motor to a steering mechanism via a gear mechanism (reduction gear mechanism) or by a direct drive system.

In such an electric power steering apparatus, an assist characteristic which defines a relationship between a steering torque applied to a steering wheel and a target value of an assist torque to be applied to the steering mechanism from the electric motor is preliminarily determined, and stored as an assist map in a memory. An assist torque target value for a given steering torque is read out of the assist map. The electric motor is controlled to be driven on the basis of the assist torque target value thus read out.

As shown in FIG. 9, the assist characteristic is defined so that the assist torque target value is increased as the steering torque increases. For example, the steering torque is assigned a positive value for rightward steering, and assigned a negative value for leftward steering. The assist characteristic is defined so that a positive assist torque target value corresponds to a positive steering torque value and a negative assist torque target value corresponds to a negative steering torque value.

When the assist torque target value is positive, the steering assist force acts on the steering mechanism for turning steerable wheels rightward. When the assist torque target value is negative, on the other hand, the steering assist force acts on the steering mechanism for turning the steerable wheels leftward. Where the steering torque has a value within a dead zone around zero, the assist torque target value is set at zero.

The electric power steering apparatus employing the assist characteristic is problematic in that, when a driver performs a return stroke steering operation to turn the steering wheel back to a steering angle midpoint, the driver is liable to have a heavier steering feeling (so-called "spring feeling") such that the steering wheel is returned to the steering angle midpoint more heavily than intended by the driver. That is, the steering torque is reduced in the return stroke steering operation, so that the assist force is correspondingly reduced. Therefore, the steering wheel receives a reverse input from the wheels thereby to be heavily returned to the steering angle midpoint.

Further, the electric power steering apparatus is problematic in that, when the driver performs a steering holding operation to hold the steering wheel at a certain steering angle, a steering burden is increased.

These problems can be solved by increasing the inclination of an assist characteristic curve so that the assist torque target value is set greater for a given steering torque. In this case, however, a steering response is reduced when the driver performs a forward stroke steering to actively turn the steering wheel.

SUMMARY OF THE INVENTION

The aforesaid problems are solved by an arrangement proposed in Japanese Patent Application No. 2003-51539 previously filed by the applicant (assignee) of the present application. With the proposed arrangement, the assist torque target value is determined on the basis of a basic assist characteristic in the forward stroke steering. In the steering holding operation and the return stroke steering operation, the assist torque target value is determined on the basis of a modified assist characteristic prepared by shifting the basic assist characteristic by a predetermined shift amount so as to increase the assist torque.

Thus, a sufficient steering response can be provided in the forward stroke steering. Further, a sufficient steering assist force is transmitted to the steering mechanism in the return stroke steering operation, thereby eliminating the unwanted heavier steering feeling (spring feeling) such that the steering wheel is returned to the steering angle midpoint more heavily than intended by the driver. In the steering holding operation, the steering burden can be alleviated.

With the arrangement according to the prior application, however, the shift amount employed in the steering holding operation and the return stroke steering operation is constant irrespective of the steering burden applied before or after the return stroke steering operation or in the steering holding operation. Therefore, the driver is liable to have an uncomfortable steering feeling. Particularly, when a U-turn steering operation is performed, the steering wheel is turned by a greater steering angle, then held at the steering angle for a short period of time, and turned back. In the last half of the U-turn steering operation (in the instance of the switching from the short-period steering holding operation to the return stroke steering operation), the steering burden is suddenly reduced. This is the cause of the uncomfortable steering feeling.

It is therefore an object of the present invention to provide an electric power steering apparatus which eliminates the uncomfortable steering feeling to make the steering feeling comfortable.

According to the present invention, an electric power steering apparatus which transmits a driving force of an electric motor to a steering mechanism for steering assist comprises: a torque sensor which detects a steering torque applied to an operation member for steering a vehicle; a basic assist characteristic determining section which determines a basic assist characteristic defining a basic characteristic of a motor driving target value for the steering torque detected by the torque sensor; a motor driving target value determining section which determines the motor driving target value for the steering torque detected by the torque sensor in accordance with a modified assist characteristic prepared by shifting the basic assist characteristic determined by the basic assist characteristic determining section along a steering torque coordinate axis; a shift amount determining section which determines the amount of the shift from the basic assist characteristic to the modified assist characteristic on the basis of the steering torque detected by the torque sensor; and a motor driving section which drives the electric motor on the basis of the motor driving target value determined by the motor driving target value determining section.

According to the present invention, the modified assist characteristic prepared by modifying the basic assist characteristic determined by the basic assist characteristic determining section is employed for the determination of the motor driving target value for the steering torque detected by the torque sensor. That is, the motor driving target value is determined on the basis of the modified assist characteristic.

The modification of the basic assist characteristic is achieved by shifting the basic assist characteristic along the steering torque coordinate axis, and the shift amount is determined on the basis of the steering torque. Thus, the shift amount is properly determined according to the level of a steering burden, so that an uncomfortable steering feeling can be eliminated. Therefore, a comfortable steering feeling can be ensured.

The shift amount determining section preferably determines the shift amount so that the absolute value of the shift amount is reduced as the absolute value of the steering torque increases in a range greater than a predetermined threshold value (e.g., a lower limit of a torque value detected when a steering angle is great as in the U-turn steering operation). Thus, the absolute value of the shift amount is minimized, for example, in the U-turn steering operation. Therefore, the uncomfortable steering feeling can effectively be suppressed without sudden reduction of the steering force.

The shift amount determining section preferably sets the amount of the shift from the basic assist characteristic to the modified assist characteristic at zero in the forward stroke steering where the operation member is operated apart from a steering angle midpoint. Further, the shift amount determining section preferably sets the amount of the shift from the basic assist characteristic to the modified assist characteristic at a value such that the motor driving target value for the steering torque detected by the torque sensor has an increased absolute value in the modified assist characteristic in the steering holding operation and in the return stroke steering operation where the operation member is operated toward the steering angle midpoint.

With this arrangement, the shift amount is set at zero in the forward stroke steering (where the operation member is operated apart from the steering angle midpoint) and is determined so that the motor driving target value has a greater absolute value in the modified assist characteristic than in the basic assist characteristic in the steering holding operation and in the return stroke steering operation (where the operation member is operated toward the steering angle midpoint).

More specifically, a steering speed detecting section which detects the steering speed of the operation member is provided, and a shift direction and a shift amount of the basic assist characteristic are variably set according to the direction (equal to the steering direction) and the absolute value of the steering speed detected by the steering speed detecting section. For example, it is herein assumed that the steering torque detected by the torque sensor has a positive value for rightward steering and has a negative value for leftward steering, and the motor driving target value is assigned a positive value for the positive steering torque value and assigned a negative value for the negative steering torque value in the basic assist characteristic. Further, it is assumed that the steering speed has a positive value for the rightward steering and has a negative value for the leftward steering.

With a steering torque value of not smaller than zero, for example, the shift amount is set at zero when the steering speed has a positive value not smaller than a first predetermined value (in the forward stroke steering), and is determined according to the steering speed when the steering speed has a value smaller than the first predetermined value. At this time, it is merely necessary to shift the basic assist characteristic negatively along the steering torque coordinate axis, but not positively along the steering torque coordinate axis. That is, the shift amount may be set at zero when the steering speed is at the first predetermined value, and determined so as to be reduced monotonously (stepwise or linearly) to a negative lower limit as the steering speed decreases when the steering speed is lower than the first predetermined value. Thus, the basic assist characteristic is shifted toward the origin in a positive steering torque range, so that the steering assist force is increased to eliminate the spring feeling occurring in the return stroke steering operation. The first predetermined value should be not smaller than zero. If the first predetermined value is a positive value, the steering assist force can be increased in the steering holding operation where the steering speed is virtually zero. Therefore, the steering burden on the driver can be alleviated in the steering holding operation. In the return stroke steering operation where the steering speed has a negative value, the shift amount may variably be set according to the steering speed, or may be fixed at the negative lower limit irrespective of the steering speed.

With a negative steering torque value, the shift amount is set at zero when the steering speed has a negative value not greater than a second predetermined value, and is determined according to the steering speed when the steering speed has a value greater than the second predetermined value. At this time, it is merely necessary to shift the basic assist characteristic positively along the steering torque coordinate axis but not negatively along the steering torque coordinate axis. That is, the shift amount may be set at zero when the steering speed is at the second predetermined value, and determined so as to be increased monotonously (stepwise or linearly) to a positive upper limit as the steering speed increases when the steering speed is higher than the second predetermined value. Thus, the basic assist characteristic is shifted toward the origin in a negative steering torque range, so that the steering assist force is increased to eliminate the spring feeling occurring in the return stroke steering operation. The second predetermined value should be not greater than zero. If the second predetermined value is a negative value, the steering assist force can be increased in the steering holding operation where the steering speed is virtually zero. Therefore, the steering burden on the driver can be alleviated in the steering holding operation. In the return stroke steering operation where the steering speed has a positive value, the shift amount may variably be set according to the steering speed, or may be fixed at the positive upper limit irrespective of the steering speed.

The motor driving target value is determined on the basis of the modified assist characteristic thus prepared, so that the assist characteristic can be determined differently between the forward stroke steering and the return stroke steering operation. Thus, a sufficient steering response can be provided in the forward stroke steering, and a sufficient steering assist force is transmitted to the steering mechanism in the return stroke steering operation, thereby eliminating an unwanted heavier steering feeling (spring feeling) such that the steering wheel is returned to the midpoint more heavily than intended by the driver. In addition, the same basic assist map is employed in the forward stroke steering, so that the steering burden does not vary according to the steering speed. Therefore, the basic assist map can easily be tuned.

The electric power steering apparatus described above may further comprise: a vehicle speed sensor which detects the traveling speed of the vehicle mounted with the electric power steering apparatus; and a vehicle speed adaptive shift amount determining section which variably sets the amount of the shift from the basic assist characteristic to the modified assist characteristic according to the vehicle speed detected by the vehicle speed sensor.

With this arrangement, the shift amount of the basic assist characteristic is variably set according to the vehicle speed. Therefore, the steering operation can properly be performed even if little modification to the assist characteristic is required, for example, when the vehicle is at a stop or travels at a low speed.

The shift amount determining section preferably computes the shift amount for the steering holding operation and the return stroke steering operation on the basis of a steering torque detected by the torque sensor when the forward stroke steering is switched to the steering holding operation or to the return stroke steering operation (immediately before or after the switching of the steering operation).

With this arrangement, the shift amount is determined on the basis of the steering torque detected when the forward stroke steering is switched to the steering holding operation or to the return stroke steering operation. Therefore, the steering assist can properly be achieved according to the steering burden in the steering holding operation and in the return stroke steering operation, thereby providing a comfortable steering feeling. In the steering holding operation and the return stroke steering operation, a processing operation to be performed by a control unit can be simplified to alleviate a computation load on the control unit as compared with a case where the shift amount is variably set according to a steering torque constantly detected on a real-time basis.

The foregoing and other objects, features and effects of the present invention will become more apparent from the following description of the preferred embodiments with reference to the attached drawings.

DESCRIPTION OF THE PREFERRED EMBODIMENTS

Figure 1:
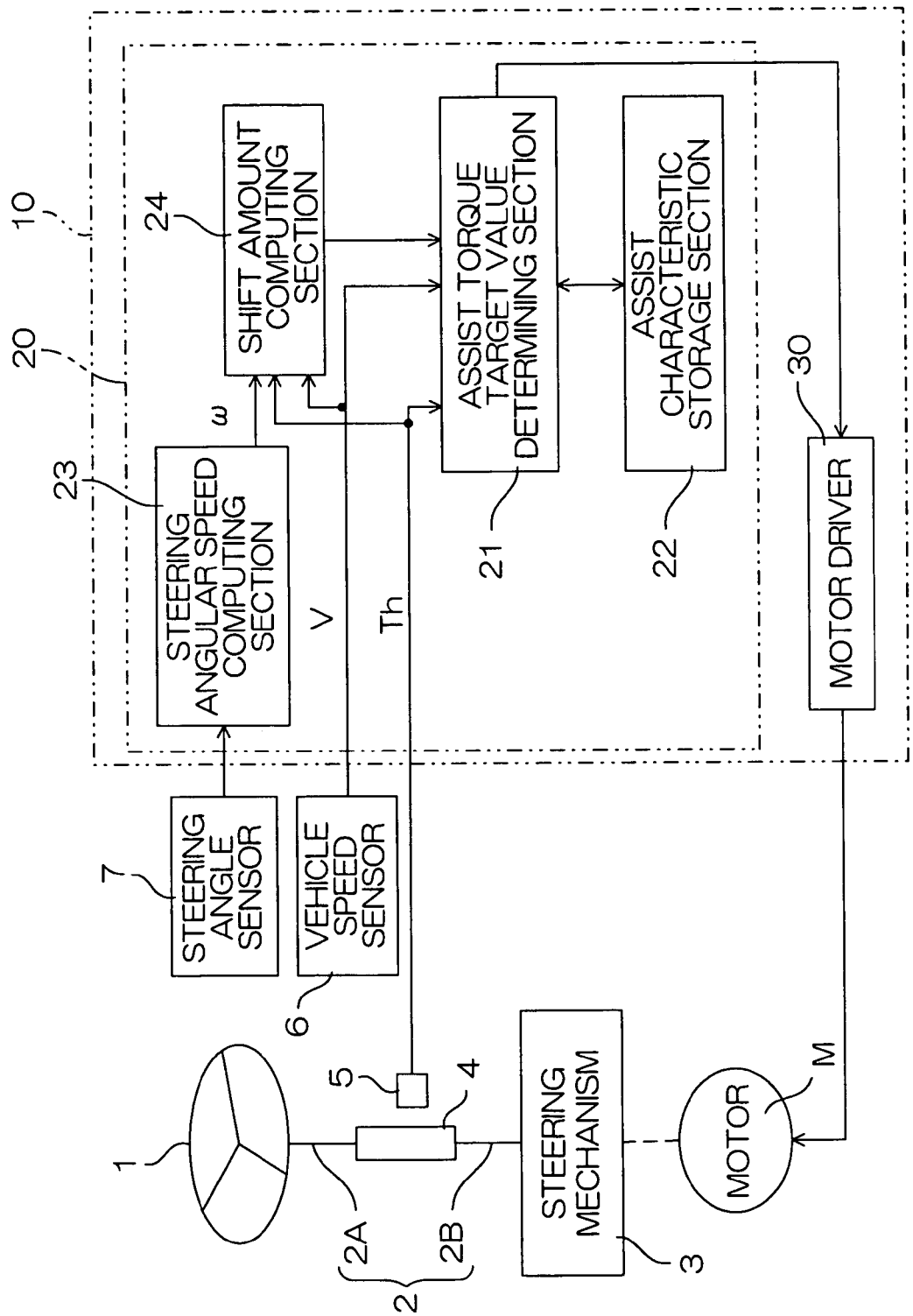
FIG. 1 is a block diagram illustrating the electrical construction of an electric power steering apparatus according to one embodiment of the present invention.

FIG. 1 is a block diagram illustrating the electrical construction of an electric power steering apparatus according to one embodiment of the present invention. A steering torque applied to a steering wheel 1 as an operation member is mechanically transmitted to a steering mechanism 3 including a rack shaft via a steering shaft 2. A steering assist force is mechanically transmitted to the steering mechanism 3 from an electric motor M via a driving force transmission mechanism such as a gear mechanism (reduction gear mechanism) or by a direct drive system.

The steering shaft 2 is divided into an input shaft 2A coupled to the steering wheel 1 and an output shaft 2B coupled to the steering mechanism 3. The input shaft 2A and the output shaft 2B are coupled to each other by a torsion bar 4. The torsion bar 4 is distorted according to the steering torque, and the direction and amount of the distortion is detected by a torque sensor 5.

The torque sensor 5 is, for example, of a magnetic type, which is adapted to detect a magnetic resistance varying according to a rotational positional relationship between the input shaft 2A and the output shaft 2B. An output signal of the torque sensor 5 is inputted to a controller 10 (ECU: electronic control unit).

An output signal of a vehicle speed sensor 6 which detects the traveling speed of a vehicle mounted with the electric power steering apparatus and an output signal of a steering angle sensor 7 which detects the steering angle of the steering wheel 1 (e.g., the rotation angle of the input shaft 2A) are inputted to the controller 10.

The controller 10 determines a target value of an assist torque to be applied to the steering mechanism 3 from the electric motor M according to a steering speed determined on the basis of the steering torque detected by the torque sensor 5, the vehicle speed detected by the vehicle speed sensor 6 and the output of the steering angle sensor 7, and controls the driving of the electric motor M so as to apply the steering assist force to the steering mechanism 3 according to the steering torque and the like.

The controller 10 includes a microprocessor 20, and a motor driver 30 which drives the electric motor M on the basis of a control signal applied from the microprocessor 20.

The microprocessor 20 includes an assist torque target value determining section 21 as a functional processing section implemented by program-based processing, and an assist characteristic storage section 22 constituted by a storage area of a memory in the microprocessor 20. The assist characteristic storage section 22 stores a plurality of basic assist maps for plural basic assist characteristics preliminarily determined for plural vehicle speed ranges. The basic assist characteristics each define a basic characteristic of the assist torque target value for the steering torque. Base values for the assist torque target value are stored in association with plural steering torque values in the form of an assist map (table) in the assist characteristic storage section 22.

The microprocessor 20 further includes a steering angular speed computing section 23 which computes a steering angular speed on the basis of the output signal of the steering angle sensor 7, and a shift amount computing section 24 which computes a shift amount to be employed for preparing a virtual modified assist characteristic by shifting the basic assist characteristic along a steering torque coordinate axis. The shift amount computing section 24 computes the shift amount on the basis of the steering angular speed ω computed by the steering angular speed computing section 23, the vehicle speed V detected by the vehicle speed sensor 6 and the steering torque T detected by the torque sensor 5 for preparing the virtual modified assist characteristic by shifting the basic assist characteristic along the steering torque coordinate axis.

The assist torque target value determining section 21 reads out an assist torque target value Ta for the modified assist characteristic from the assist characteristic storage section 22 on the basis of the steering torque T detected by the torque sensor 5, the vehicle speed V detected by the vehicle speed sensor 6 and the shift amount ΔT (whose sign indicates a shift direction and whose absolute value indicates a shift distance) computed by the shift amount computing section 24. The motor driver 30 supplies a necessary and sufficient driving current to the electric motor M on the basis of the assist torque target value Ta thus read out.

Figure 2:
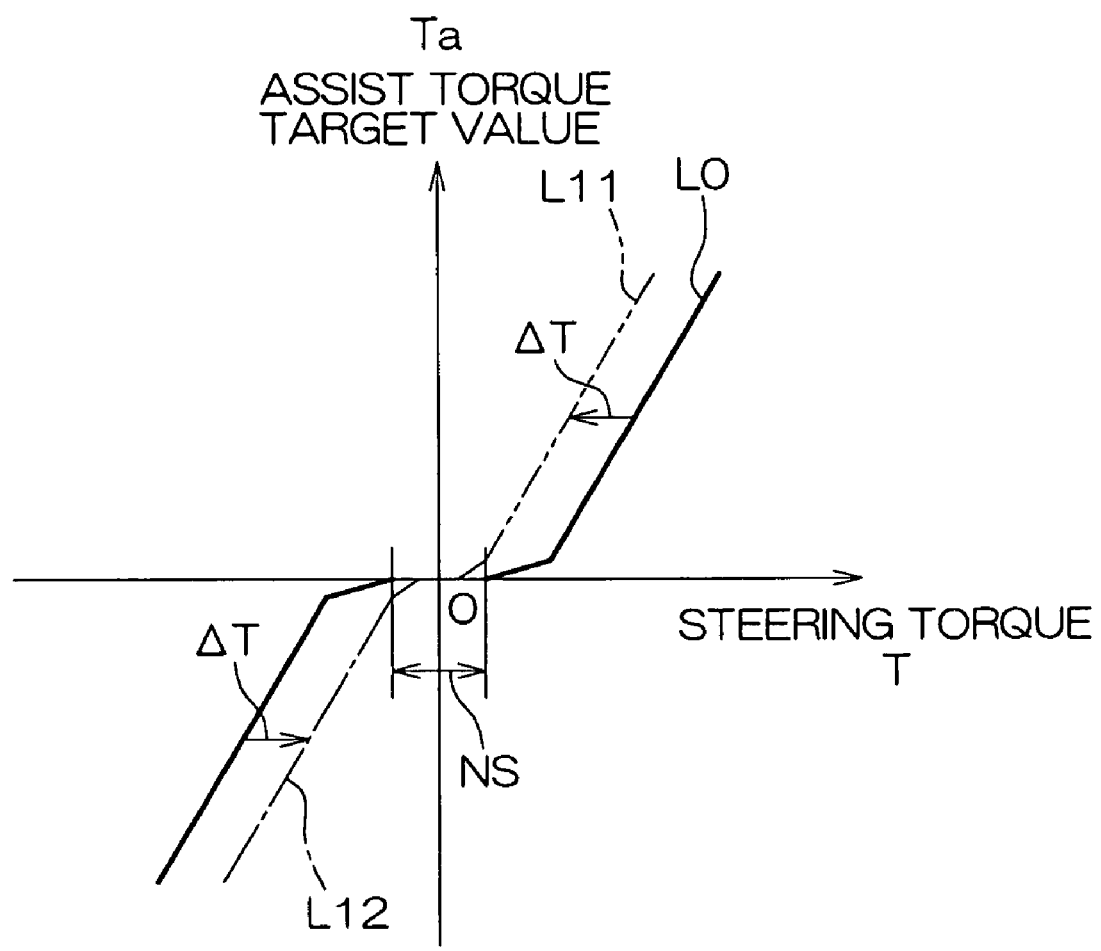
FIG. 2 is a diagram for explaining a basic assist characteristic and a modified assist characteristic prepared by shifting the basic assist characteristic along a steering torque coordinate axis.

FIG. 2 is a diagram for explaining the basic assist characteristic corresponding to the basic assist map stored in the assist characteristic storage section 22, and the modified assist characteristic prepared by shifting the basic assist characteristic along the steering torque coordinate axis.

The steering torque T detected by the torque sensor 5 has a positive value when the torque is applied to the steering wheel 1 for rightward steering, and has a negative value when the torque is applied to the steering wheel 1 for leftward steering. The basic assist characteristic is indicated by a curve L0 in FIG. 2. The basic assist characteristic is determined so that a positive assist torque target value Ta corresponds to a positive steering torque value T and a negative assist torque target value Ta corresponds to a negative steering torque value T. Although the plural basic assist maps for the plural vehicle speed ranges are stored in the assist characteristic storage section 22 as described above, only one basic assist characteristic for one vehicle speed range is shown in FIG. 2 for simplicity of the explanation.

In the basic assist characteristic indicated by the curve L0, the assist torque target value Ta is set at Ta=0 irrespective of the steering torque value T in a steering torque range around T=0. This steering torque range is a dead zone NS.

In this embodiment, the assist torque target value Ta is determined on the basis of the virtual modified assist characteristic (e.g., a characteristic indicated by curves L11, L12) prepared by shifting the basic assist characteristic along the steering torque coordinate axis (positively or negatively) by the shift amount ΔT computed by the shift amount computing section 24 on the basis of the steering angular speed ω computed by the steering angular speed computing section 23, the vehicle speed V and the steering torque T.

As will be described later, the basic assist characteristic is negatively shifted along the steering torque coordinate axis when the steering torque T is not smaller than zero (see the curve L11), and is positively shifted along the steering torque coordinate axis when the steering torque T has a negative value (see the curve L12).

The shift amount computing section 24 determines a basic shift amount $\Delta T_B$ on the basis of the steering torque T and the steering angular speed ω, and determines the shift amount $\Delta T(=G_V \times G_T \times \Delta T_B)$ by multiplying the basic shift amount $\Delta T_B$ by a vehicle speed gain $G_V$ and a torque gain $G_T$ to be described later.

The basic shift amount $\Delta T_B(=\Delta T_0 \times k_\omega)$ is determined on the basis of a factor (steering angular speed factor) $k_\omega$ dependent on the steering angular speed ω and a shift base value $\Delta T_0(\Delta T_0 \geq 0)$ dependent on a steering torque T sampled immediately after the steering is switched from a forward stroke steering to a steering holding operation or to a return stroke steering operation.

Figure 3B:
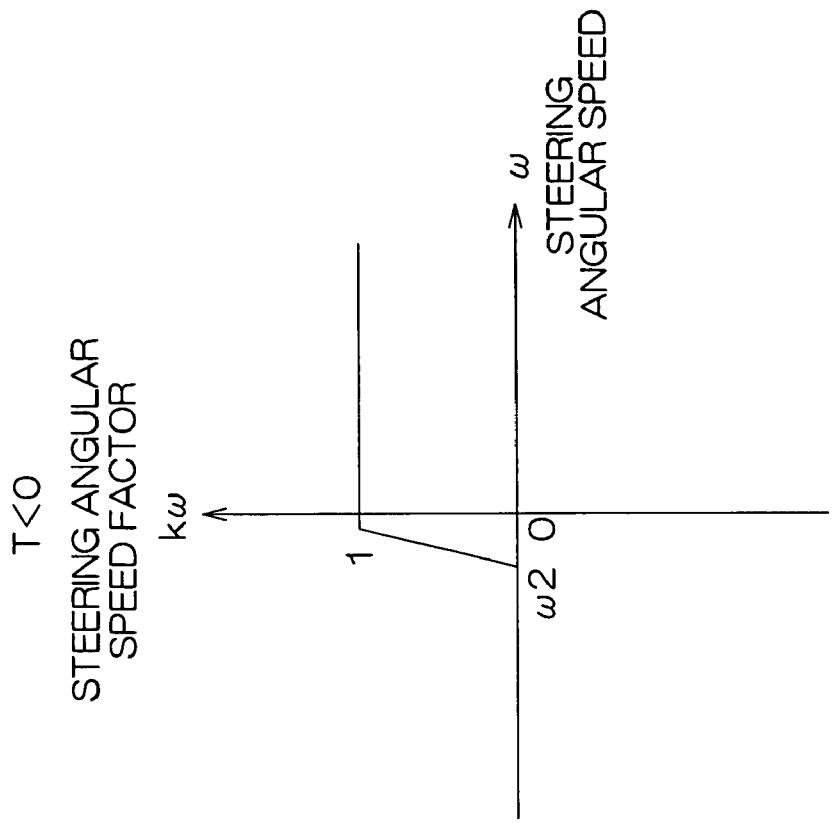
FIGS. 3(a) and 3(b) are diagrams illustrating relationships between a steering angular speed factor and a steering angular speed.
Figure 3A:
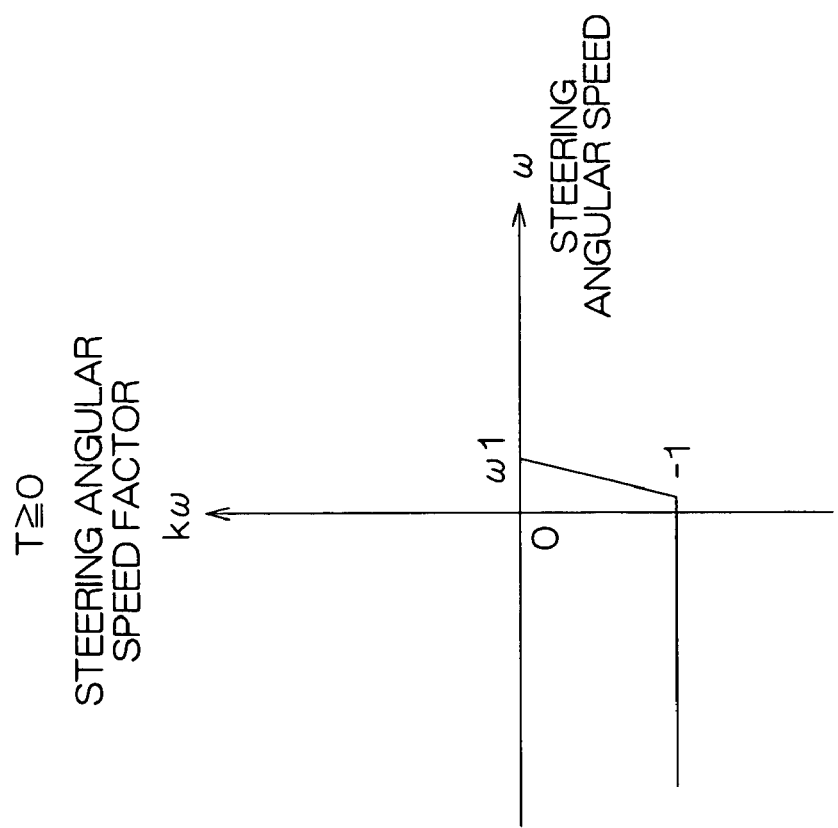

FIGS. 3(a) and 3(b) are diagrams illustrating relationships between the steering angular speed factor $k_\omega$ and the steering angular speed ω. The shift amount computing section 24 has a memory which stores tables, for example, for the characteristic curves (broken lines in this case) shown in FIGS. 3(a) and 3(b). The shift amount computing section 24 determines the steering angular speed factor $k_\omega$ on the basis of the table of the characteristic shown in FIG. 3(a) when the steering torque T is T≧0, and determines the steering angular speed factor $k_\omega$ on the basis of the table of the characteristic shown in FIG. 3(b) when the steering torque T is T<0.

In the table of the characteristic of FIG. 3(a) to be employed when T≧0, the steering angular speed factor $k_\omega$ is set at zero or a negative value when the steering angular speed ω is in a range not greater than a first predetermined value ω1 (>0). More specifically, the steering angular speed factor $k_\omega$ is determined so as to be reduced monotonously (linearly in FIG. 3(a)) to a predetermined lower limit (a lower limit of −1 in FIG. 3(a)) as the steering angular speed ω decreases in the range not greater than the first predetermined value ω1. On the contrary, when the steering angular speed ω is greater than the first predetermined value ω1, the steering angular speed factor $k_\omega$ is set at $k_\omega$=0 irrespective of the steering angular speed ω.

In the table of the characteristic of FIG. 3(b) to be employed when T<0, the steering angular speed factor $k_\omega$ is set at zero or a positive value when the steering angular speed ω is in a range not smaller than a second predetermined value ω2 (ω2<0, e.g., |ω2|=ω1). More specifically, the steering angular speed factor $k_\omega$ is determined so as to be increased monotonously (linearly in FIG. 3(b)) to a predetermined upper limit (an upper limit of 1 in FIG. 3(b)) as the steering angular speed ω increases in the range not smaller than the second predetermined value ω2. On the contrary, when the steering angular speed ω is smaller than the second predetermined value ω2, the steering angular speed factor $k_\omega$ is set at $k_\omega$=0 irrespective of the steering angular speed ω.

In the forward stroke steering (for turning the steering wheel apart from a steering angle midpoint) where the direction of the steering torque T coincides with the direction of the steering angular speed ω, the basic shift amount $\Delta T_B$ is zero. In the return stroke steering operation (for turning the steering wheel toward the steering angle midpoint) where the direction of the steering torque T does not coincide with the direction of the steering angular speed ω, the basic shift amount $\Delta T_B$ is determined so that the basic assist characteristic is shifted toward the origin along the steering torque coordinate axis. When the steering angular speed ω has a value around zero (ω2<ω<ω1) the basic shift amount $\Delta T_B$ is determined so that the basic assist characteristic is shifted toward the origin along the steering torque coordinate axis.

Since the basic assist characteristic is not shifted in the forward stroke steering, the steering burden does not vary according to the steering angular speed. Therefore, the basic assist characteristic can easily be tuned, and a sufficient steering response can be provided to the driver. In the return stroke steering operation and the steering holding operation, the basic assist characteristic is shifted toward the origin, whereby the spring feeling can be eliminated in the return stroke steering operation and the steering burden can be alleviated in the steering holding operation. Thus, a comfortable steering feeling can be ensured.

Figure 4:
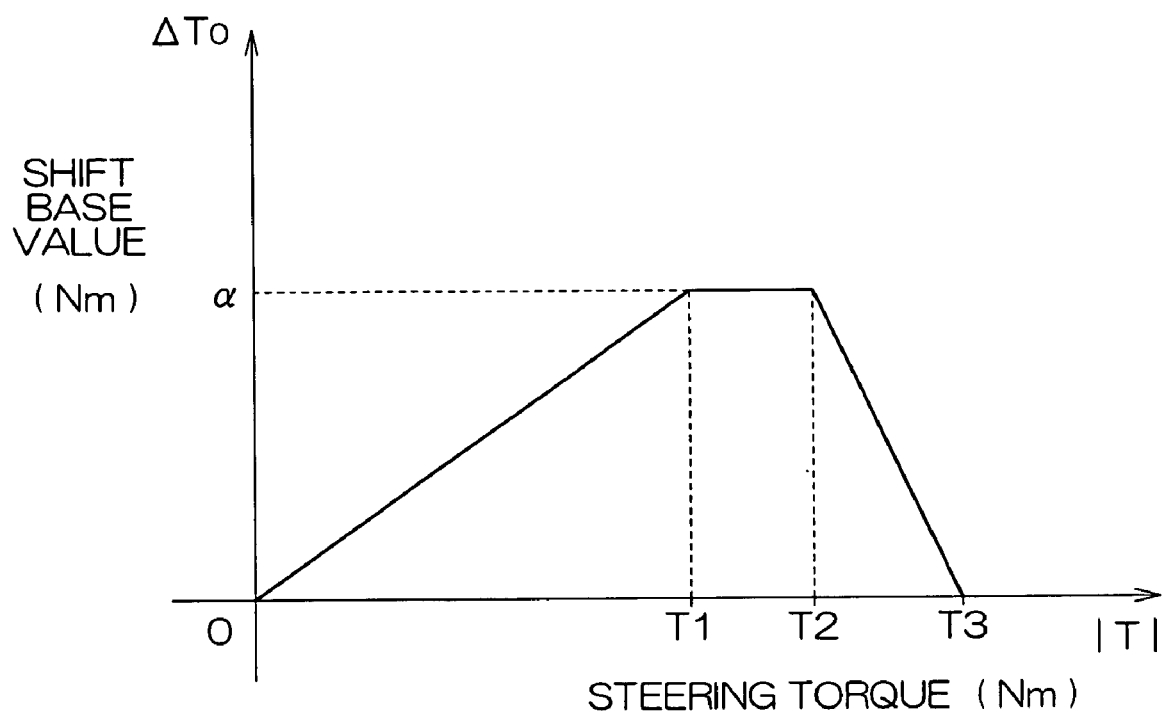
FIG. 4 is a diagram illustrating a relationship between a shift base value and the absolute value of a steering torque.

FIG. 4 is a diagram for explaining a relationship between the shift base value $\Delta T_0$ and the absolute value |T| of the steering torque T sampled immediately after the switching from the forward stroke steering to the steering holding operation or to the return stroke steering operation. The shift amount computing section 24 has a memory which stores a table, for example, for a characteristic curve (broken line) as shown in FIG. 4.

In FIG. 4, the range of the steering torque absolute value |T| is divided by a first threshold value T1 (e.g., 4 (Nm)), a second threshold value T2 (e.g., 5 (Nm)) and a third threshold value T3 (e.g., 6 (Nm)). In a range of $0 \leq |T| < T1$, the shift base value $\Delta T_0$ is determined so as to be linearly increased to an upper limit α (e.g., α=0.5 Nm) as the steering torque absolute value |T| increases. In a range of $T1 < |T| \leq T2$, the shift base value $\Delta T_0$ is set at $\Delta T_0 = \alpha$ irrespective of the steering torque absolute value |T|. In a range of $T2 < |T| \leq T3$, the shift base value $\Delta T_0$ is determined so as to be linearly reduced from the upper limit α to zero. In a range of $T3 < |T|$, the shift base value $\Delta T_0$ is set at $\Delta T_0 = 0$ irrespective of the steering torque absolute value |T|.

Since the basic shift amount $\Delta T_B$ is determined on the basis of the characteristic specified for the range of $0 \leq |T| \leq T1$ according to the steering burden in the steering holding operation or in the return stroke steering operation, the uncomfortable steering feeling can be minimized. Thus, a comfortable steering feeling can be ensured.

Immediately after the switching to the steering holding operation in the U-turn steering operation where the steering angle is great, the steering torque absolute value |T| is relatively great in a range of $T2 < |T|$. In this situation, the absolute value of the basic shift amount $\Delta T_B$ is reduced as the steering torque absolute value |T| increases. This prevents a phenomenon such that the steering assist force is suddenly reduced in the last half of the steering operation. Therefore, the uncomfortable steering feeling can be prevented.

Figure 5:
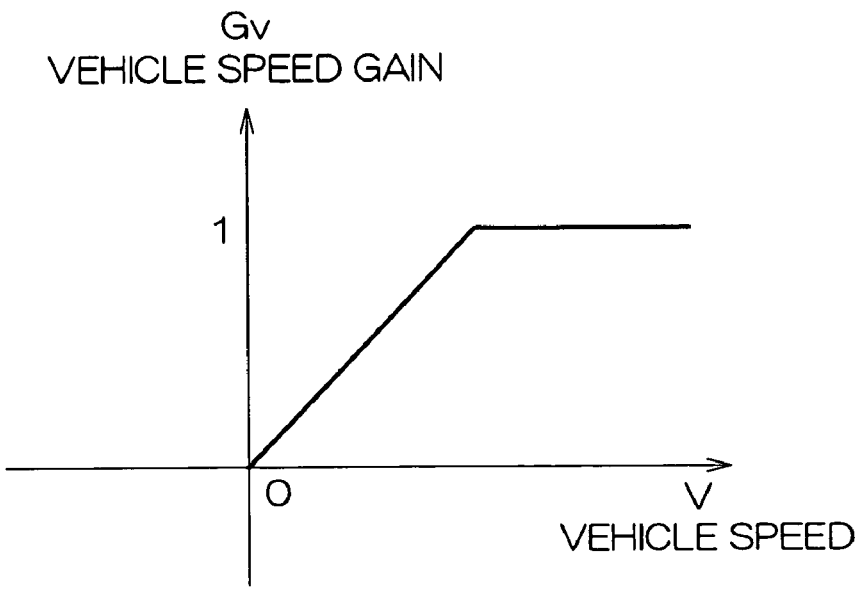
FIG. 5 is a diagram for explaining the variable setting of a shift amount for a vehicle speed.
Figure 6:
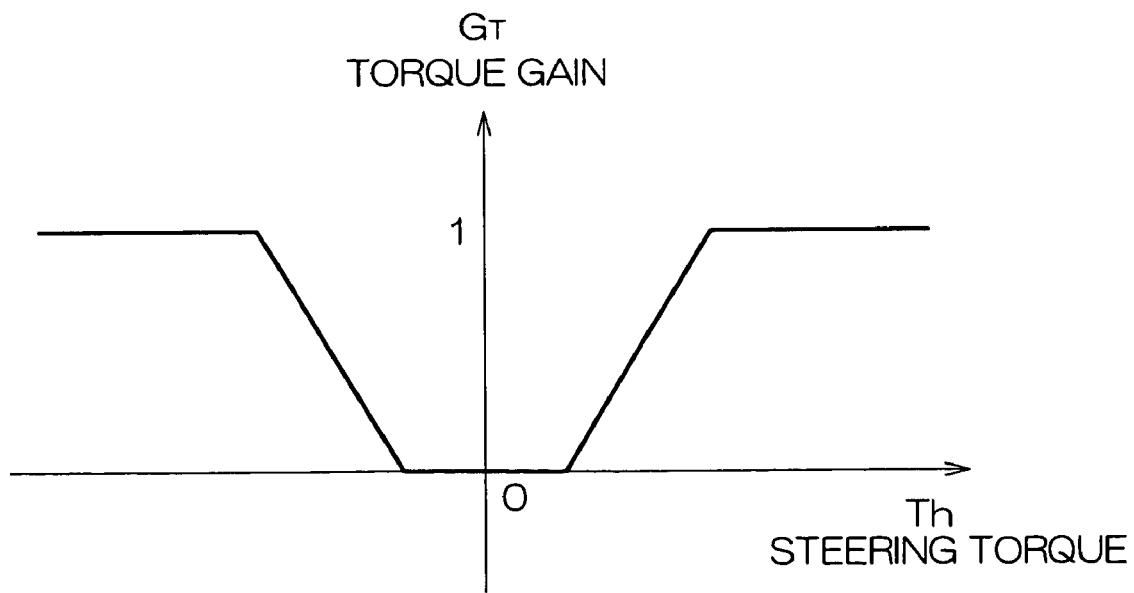
FIG. 6 is a diagram for explaining the variable setting of the shift amount for the steering torque.

FIG. 5 is a diagram for explaining the variable setting of the shift amount $\Delta T$ for the vehicle speed V, and FIG. 6 is a diagram for explaining the variable setting of the shift amount $\Delta T$ for the steering torque T. The shift amount computing section 24 determines the steering angular speed factor $k_\omega$ and the shift base value $\Delta T_0$ on the basis of the characteristics shown in FIGS. 3(a), 3(b) and 4, and determines the basic shift amount $\Delta T_B$ on the basis of the steering angular speed factor $k_\omega$ and the shift base value $\Delta T_0$. Further, the shift amount computing section 24 determines the shift amount $\Delta T$ ($= \Delta T_B \times G_V \times G_T$) by multiplying the basic shift amount $\Delta T_B$ by the vehicle speed gain $G_V$ determined on the basis of the characteristic shown in FIG. 5 and the torque gain $G_T$ determined on the basis of the characteristic shown in FIG. 6. The assist torque target value determining section 21 searches the basic assist map stored in the assist characteristic storage section 22 on the basis of the shift amount $\Delta T$. Thus, the assist torque target value Ta is read out according to the modified assist characteristic virtually determined on the basis of the steering angular speed ω, the vehicle speed V and the steering torque T.

The vehicle speed gain $G_V$ is determined so as to be increased monotonously (linearly in this case) to a predetermined upper limit (an upper limit of 1 in FIG. 5) as the vehicle speed V increases in a range from zero to a predetermined vehicle speed.

Thus, the steering operation can properly be performed even if little modification to the assist characteristic is required, for example, when the vehicle is at a stop or travels at a low speed.

On the other hand, the torque gain $G_T$ has a dead zone around a steering torque T of T=0. Outside the dead zone, the torque gain $G_T$ is determined so as to be increased monotonously (linearly in this case) to a predetermined upper limit (an upper limit of 1 in this case) as the absolute value of the steering torque T increases. Thus, the steering assist is limited when the steering assist is not required with the steering torque T being around T=0.

On the basis of the shift amount $\Delta T$ thus determined, the assist torque target value Ta is determined according to the virtual modified assist characteristic prepared by shifting the basic assist characteristic by the shift amount $\Delta T$ along the steering torque coordinate axis.

More specifically, where the basic assist characteristic Ta is expressed by a function Ta=f(T), a steering torque value T* for the assist map search is determined by subtracting the shift amount $\Delta T$ from the steering torque T detected by the torque sensor 5 (i.e., $T^* = T - \Delta T$), and the basic assist map stored in the assist characteristic storage section 22 is searched on the basis of the search-oriented steering torque value T*. Thus, the assist torque target value Ta (=f(T*)) can be determined on the basis of the virtual modified assist characteristic.

Figure 7:
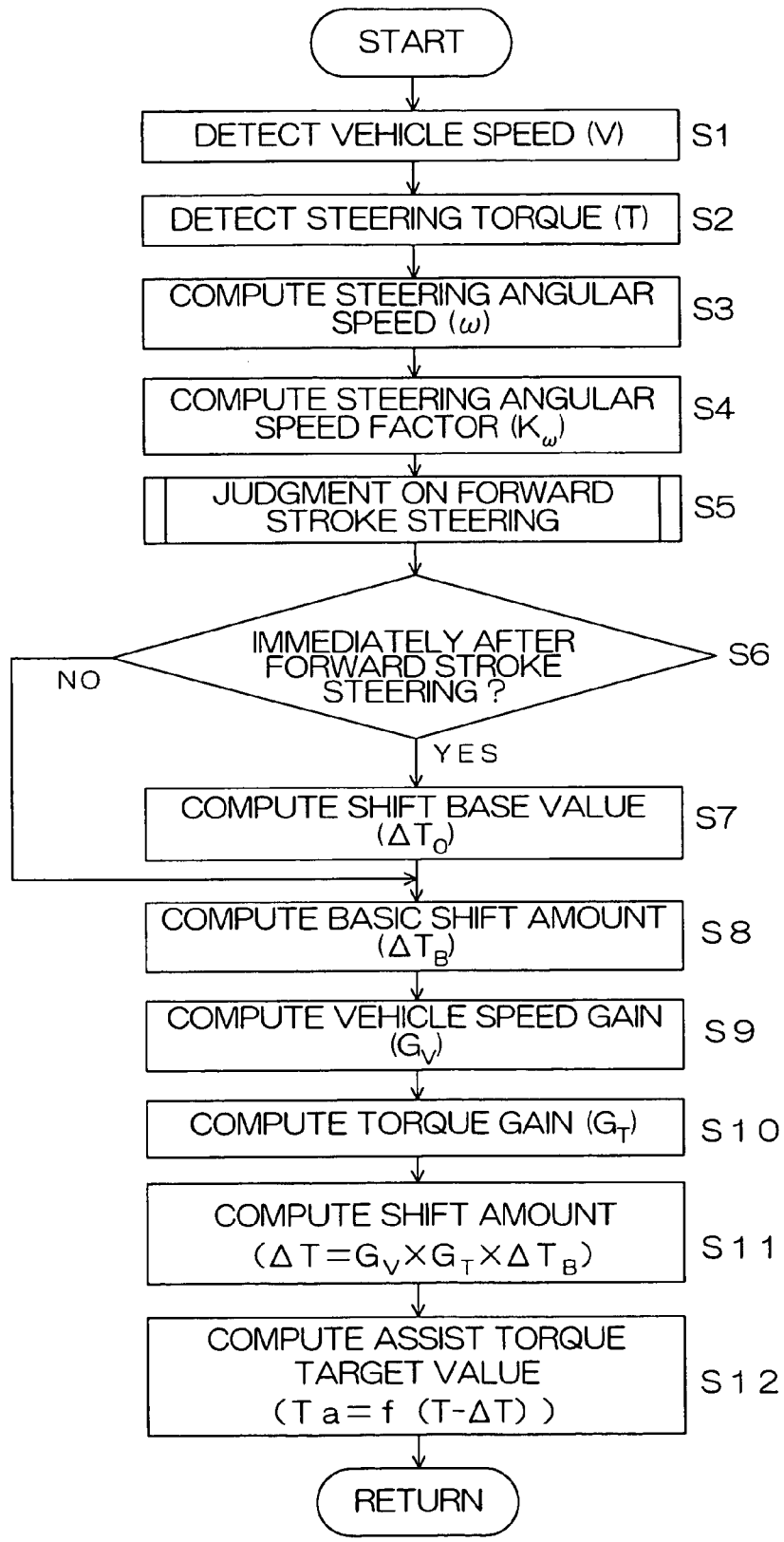
FIG. 7 is a flow chart for explaining a processing operation to be performed repeatedly in a predetermined control cycle by a microprocessor for controlling the driving of an electric motor.

FIG. 7 is a flow chart for explaining a processing operation to be performed repeatedly in a predetermined control cycle by the microprocessor 20. The microprocessor 20 reads a vehicle speed V detected by the vehicle speed sensor 6 and a steering torque T detected by the torque sensor 5 (Steps S1, S2). Further, the steering angular speed computing section 23 reads an output signal of the steering angle sensor 7, and determines a steering angular speed ω (Step S3). On the basis of the steering angular speed ω thus determined, the shift amount computing section 24 reads a steering angular speed factor $k_\omega$ for the steering angular speed ω (Step S4). Then, the shift amount computing section 24 judges whether the forward stroke steering is performed (Step S5). Where the sign of the steering torque T coincides with the sign of the steering angular speed ω, for example, it is judged that the forward stroke steering is performed. Otherwise, it is judged that the forward stroke steering is not performed (but the steering holding operation or the return stroke steering operation is performed).

If it is judged for the first time that the steering holding operation or the return stroke steering operation is performed after the judgment of the forward stroke steering (YES in Step S6), the steering torque T (Step S2) detected in this control cycle is referred to, and a shift base value $\Delta T_0$ (see FIG. 4) for the steering torque T is determined (Step S7). Thereafter, the shift base value $\Delta T_0$ is kept unchanged as long as it is continuously judged that the steering holding operation or the return stroke steering operation is performed (NO in Step S6). During the steering holding operation or the return stroke steering operation, the shift base value $\Delta T_0$ is kept at a value corresponding to the steering torque T detected immediately after the switching from the forward stroke steering to the steering holding operation or to the return stroke steering operation.

The shift amount computing section 24 determines the basic shift amount $\Delta T_B = \Delta T_0 \times k_\omega$ on the basis of the shift base value $\Delta T_0$ thus determined (Step S8). Further, the shift amount computing section 24 determines a vehicle speed gain $G_V$ on the basis of the vehicle speed V detected by the vehicle speed sensor 6 (Step S9), and determines a torque gain $G_T$ on the basis of the steering torque T detected by the torque sensor 5 (Step S10). Then, a shift amount $\Delta T$ is computed by multiplying the basic shift amount $\Delta T_B$ by the vehicle speed gain $G_V$ and the torque gain $G_T$ thus determined (Step S11).

The shift amount $\Delta T$ thus determined is applied to the assist torque target value determining section 21. The assist torque target value determining section 21 determines a search-oriented steering torque value T* ($T^* = T - \Delta T$), and searches the basic assist map stored in the assist characteristic storage section 22 on the basis of the search-oriented steering torque value T* (Step S12).

Thus, an assist torque target value Ta is read out of the assist characteristic storage section 22 according to a virtual modified assist characteristic prepared by shifting the basic assist characteristic by the shift amount $\Delta T$ along the steering torque coordinate axis. On the basis of the assist characteristic target value Ta thus read out, the motor driver 30 is controlled, so that a driving force correspondingly generated by the motor M is applied to the steering mechanism 3.

Figure 8:
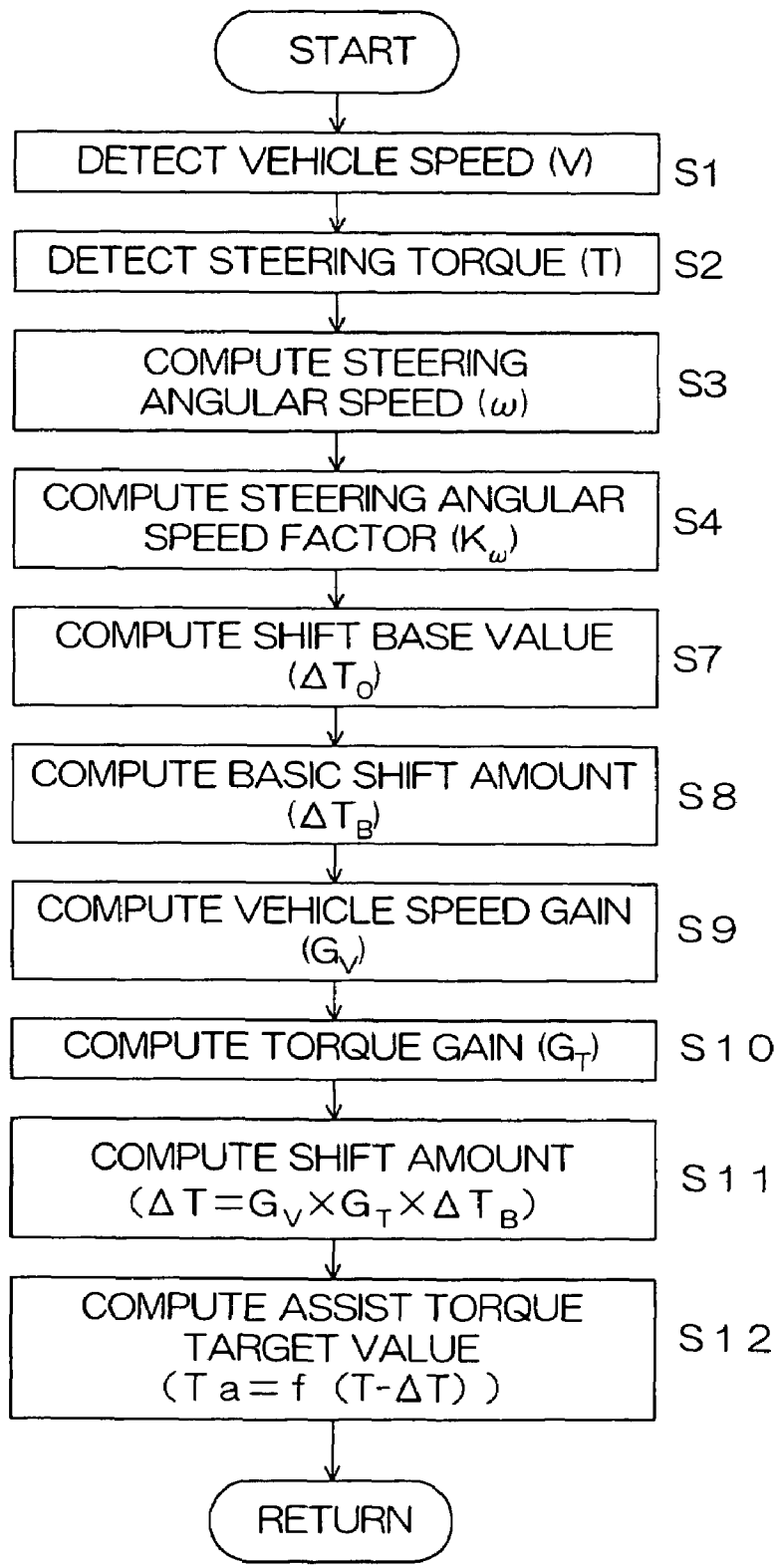
FIG. 8 is a flow chart for explaining a processing operation to be performed by a microprocessor according to a second embodiment of the present invention.
Figure 9:
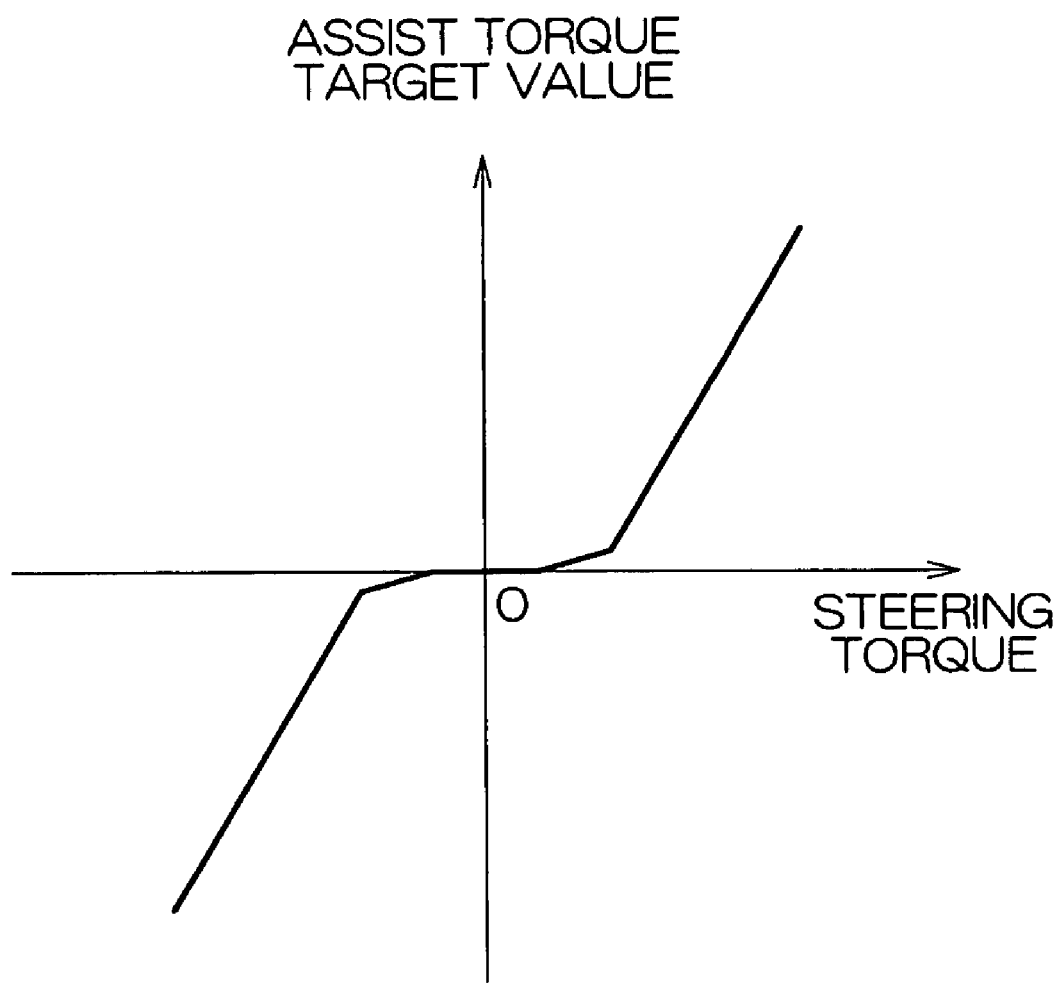
FIG. 9 is a diagram illustrating an exemplary assist characteristic.

FIG. 8 is a flow chart for explaining a processing operation to be performed in an electric power steering apparatus according to a second embodiment of the present invention. For the explanation of the second embodiment, reference will be made again to FIGS. 1 to 6. In FIG. 8, steps corresponding to those shown in FIG. 7 will be denoted by the same reference characters as in FIG. 7.

In this embodiment, Steps S5 and S6 are omitted, so that the shift base value $\Delta T_0$ varies on a real-time basis according to the steering torque T detected in every control cycle. Thus, the shift amount is variably set according to the steering force in the steering holding operation and in the return stroke steering operation. Therefore, the steering feeling can further be improved.

While the embodiments of the present invention have thus been described, the invention may be embodied in any other ways. Although the vehicle speed V is taken into consideration for the determination of the shift amount $\Delta T$ of the assist characteristic in the embodiments described above, the variable setting of the shift amount depending on the vehicle speed V is not necessarily required. That is, the shift amount $\Delta T$ may be determined by multiplying the basic shift amount $\Delta T_B$ by the torque gain $G_T$ alone without the use of the vehicle gain $G_V$. Alternatively, the basic shift amount $\Delta T_B$ may be employed as the shift amount $\Delta T$ without the use of the vehicle gain $G_V$ and the torque gain $G_T$. Further, the shift amount $\Delta T$ may be determined by multiplying the basic shift amount $\Delta T_B$ by the vehicle gain $G_V$ alone without the use of the torque gain $G_T$.

Further, the torque gain $G_T$ and the shift base value $\Delta T_0$ may be employed in combination to provide a map indicating a relationship between the steering torque T and $G_T \times \Delta T_0$.

In the embodiments described above, the assist map for the basic assist characteristic is stored in the assist characteristic storage section 22, and the assist torque target value Ta is read out of the assist map. However, the assist torque target value Ta for the search-oriented steering torque value T* may be determined by function-based computation.

Similarly, the shift amount computing section 24 may be adapted to preliminarily store the characteristic of the steering angular speed factor $k_\omega$ for the steering angular speed $\omega$ and the characteristic of the shift base value $\Delta T_0$ for the steering torque T in a memory thereof, or may be adapted to determine the steering angular speed factor $k_\omega$ for the steering angular speed $\omega$ and the shift base value $\Delta T_0$ for the steering torque T by function-based computation. The determination of the vehicle gain $G_V$ for the vehicle speed V and the torque gain $G_T$ for the steering torque T may be achieved in the same manner.

In the embodiments described above, the assist torque target value is defined as the motor driving target value, and the characteristic of the assist torque target value for the steering torque is defined as the assist characteristic. However, the present invention is not limited to this arrangement. A motor current target value or a motor voltage target value may be defined as the motor driving target value, and a relationship between the steering torque and the motor current target value or the motor voltage target value may be defined as the assist characteristic.

In the embodiments described above, the steering angular speed is computed by time-based differentiation of the steering angle detected by the steering angle sensor 7. However, where a brush motor is adopted as the electric motor M, a counter-electromotive force to be generated between terminals of the electric motor M may be determined on the basis of an output of a motor current detection circuit which determines a motor current of the electric motor M and an output of an inter-terminal voltage detection circuit which detects an inter-terminal voltage of the electric motor M, and the steering angular speed may be estimated on the basis of the counter-electromotive force without the use of the steering angle sensor.

A brushless motor may be adopted as the electric motor M. In this case, the output of a resolver associated with the brushless motor may be used to calculate the steering angular speed without the use of the steering angle sensor. Specifically, a motor mechanical angle is calculated based on the output of the resolver, and the motor angular speed is calculated by time-based differentiation of the motor mechanical angle. The motor angle speed is then converted in terms of the steering shaft to obtain the steering angular speed.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2003-315732 filed with the Japanese Patent Office on Sep. 8, 2003, the disclosure of which is incorporated herein by reference.

What is claimed is:

1. An electric power steering apparatus which transmits a driving force of an electric motor to a steering mechanism for steering assist in a vehicle, the apparatus comprising:

a motor driver which drives the electric motor according to a target value;

a torque sensor which detects a steering torque applied to a steering member for steering the vehicle;

a basic assist section which determines a basic assist value according to the steering torque detected by the torque sensor;

a target value determining section which determines the target value by shifting the basic assist value along a steering torque coordinate axis to a modified assist value, whereby the modified assist value acts as the target value; and a shift amount determining section which determines an amount of the shift from the basic assist value to the modified assist value on the basis of the steering torque detected by the torque sensor;

wherein the shift amount determining section sets the amount of the shift from the basic assist value to the modified assist value at zero in a forward stroke steering where the steering member is moved away from a steering angle midpoint, and sets the amount of the shift from the basic assist value to the modified assist value at a value such that the target value has an increased absolute value of the modified assist value in a steering holding position and in a return stroke steering operation where the steering member is moved toward the steering angle midpoint.

2. An electric power steering apparatus which transmits a driving force of an electric motor to a steering mechanism for steering assist in a vehicle, the apparatus comprising:
- a motor driver which drives the electric motor according to a target value;
- a torque sensor which detects a steering torque applied to a steering member for steering the vehicle;
- basic assist section which determines a basic assist value according to the steering torque detected by the torque sensor;
- a target value determining section which determines the target value by shifting the basic assist value along a steering torque coordinate axis to a modified assist value, whereby the modified assist value acts as the target value; and
- a shift amount determining section which determines an amount of the shift from the basic assist value to the modified assist value on the basis of the steering torque detected by the torque sensor;
- wherein the shift amount determining section computes the shift amount for the steering holding operation and the return stroke steering operation on the basis of the steering torque detected by the torque sensor when the forward stroke steering is switched to the steering holding operation or to the return stroke steering operation.

3. An electric power steering apparatus which transmits a driving force of an electric motor to a steering mechanism for steering assist in a vehicle, the apparatus comprising:
- a motor driver which drives the electric motor according to a target value;
- a torque sensor which detects a steering torque applied to a steering member for steering the vehicle;
- a basic assist section which determines a basic assist value according to the steering torque detected by the torque sensor;
- a target value determining section which determines the target value by shifting the basic assist value along a steering torque coordinate axis to a modified assist value, whereby the modified assist value acts as the target value; and
- a shift amount determining section which determines an amount of the shift from the basic assist value to the modified assist value on the basis of the steering torque detected by the torque sensor;
- wherein the shift amount determining section determines the shift amount so that an absolute value of the shift amount is reduced as an absolute value of the steering torque increases in a range greater than a predetermined threshold value.

4. The electric power steering apparatus as set forth in claim 1,
- further comprising a steering speed detecting section which detects a steering speed of the steering member, and
- wherein the shift amount determining section variably sets a shift direction and a shift amount of the basic assist value according to a direction and an absolute value of the steering speed.

5. The electric power steering apparatus as set forth in claim 1,
- further comprising a vehicle speed detecting section which detects a traveling speed of the vehicle, and
- wherein the shift amount determining section comprises a vehicle speed adaptive shift amount determining section which variably sets the amount of the shift from the basic assist value to the modified assist value according to the vehicle speed detected by the vehicle speed detecting section.

* * * * *